(12) United States Patent
Wang et al.

(10) Patent No.: US 8,160,746 B2
(45) Date of Patent: Apr. 17, 2012

(54) SYSTEM AND METHOD FOR GRAPHICALLY ALLOCATING ROBOT'S WORKING SPACE

(75) Inventors: Wei-Han Wang, Taipei County (TW); Ya-Hui Tsai, Taoyuan County (TW); Yen-Chun Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1068 days.

(21) Appl. No.: 12/031,718

(22) Filed: Feb. 15, 2008

(65) Prior Publication Data
US 2009/0143912 A1 Jun. 4, 2009

(30) Foreign Application Priority Data

Dec. 4, 2007 (TW) ................................ 96146139 A (51) Int. Cl.
*G05B 19/19* (2006.01)
(52) U.S. Cl. ............................ 700/259; 700/245; 901/47
(58) Field of Classification Search .................. 700/259, 700/245; 901/47; 701/23
See application file for complete search history.

(56) References Cited

U.S. PATENT DOCUMENTS

| | | | | |
|---|---|---|---|---|
| 5,511,147 A | * | 4/1996 | Abdel-Malek | 700/264 |
| 5,647,015 A | * | 7/1997 | Choate et al. | 382/103 |
| 5,890,808 A | * | 4/1999 | Neff et al. | 382/209 |
| 5,963,663 A | * | 10/1999 | Tani | 382/153 |
| 5,982,930 A | * | 11/1999 | Neff et al. | 382/209 |
| 6,535,793 B2 | * | 3/2003 | Allard | 700/259 |
| 6,754,560 B2 | * | 6/2004 | Fujita et al. | 700/245 |
| 6,845,297 B2 | * | 1/2005 | Allard | 700/259 |
| 7,394,459 B2 | * | 7/2008 | Bathiche et al. | 345/175 |
| 7,773,799 B2 | * | 8/2010 | Oldroyd | 382/154 |
| 2005/0220363 A1 | * | 10/2005 | Oldroyd | 382/294 |
| 2007/0174777 A1 | * | 7/2007 | Finley et al. | 715/734 |
| 2009/0143912 A1 | * | 6/2009 | Wang et al. | 700/259 |
| 2010/0321482 A1 | * | 12/2010 | Cleveland | 348/78 |

FOREIGN PATENT DOCUMENTS

WO 0184260 A2 11/2001

* cited by examiner

*Primary Examiner* — Thomas Black
*Assistant Examiner* — Wae Louie
(74) *Attorney, Agent, or Firm* — Jianq Chyun IP Office (57) ABSTRACT

System and method for graphically allocating robot's working space are provided. The system includes an image extractor, a task-allocating server and a robot. A graphic user interface (GUI) of the task-allocating server includes a robot's working scene area, a space attribute allocating area and a robot's task area. Thus, a user assigns one certain space area in the robot's working scene area with a "wall" attribute, or another space area with a "charging station" attribute. Meanwhile, by using the GUI, the user directly assigns the robot to execute a specific task at a certain area. Hence, the user or remote controller facilitates the robot to provide safer and more effective service through his/her environment recognition.

18 Claims, 7 Drawing Sheets

SYSTEM AND METHOD FOR GRAPHICALLY ALLOCATING ROBOT'S WORKING SPACE

CROSS-REFERENCE TO RELATED APPLICATION

This application claims the priority benefit of Taiwan application serial no. 96146139, filed on Dec. 4, 2007. The entirety of the above-mentioned patent application is hereby incorporated by reference herein and made a part of this specification.

BACKGROUND OF THE INVENTION

1. Field of the Invention

The present invention generally relates to a system and a method for graphically allocating robot's working space, in particular, to a system and a method for graphically allocating robot's working space through using a user's environment recognition.

2. Description of Related Art

In recent years, with development of sensors and control theories, intelligent robot system has gradually switched from the factory automation relevant field into various service application occasions, which has opened a new field of a service robot. The prior research and development on the service robot are mainly conducted by academic research institutes. However, currently, the industrial field has paid more and more attention to such research and development of the service robot.

Currently, the services offered by the robot are mainly focused on security, touring, and assisting in doing housework. When offering such services, the robot must understand the status of the environment, for example, the size of the whole space, position and size of obstacles, wall boundaries, doorway, and charging station, etc. Many researching achievements about the detection and recognition of features in the environment have been proposed, but desirable recognition effect can only be achieved for certain features or objects. If it intends to effectively recognize various objects or areas in the environment, many technical bottlenecks are still existed for the robot. Even though various researching units all over the world successively issue various intelligent algorithms to emphasize that the robot can get to know the environment more intelligently, but in the practical application, the recognition capability and real-time serving are still rather poor and cannot meet the actual requirements. For example, in the prior art WO0184260A2, the remote control interface for the robot transmits the image back to a remote man-machine interface through a single camera mounted on the body of the robot, and then the remote controller manipulates the robot according to the image transmitted back from the remote control interface and other sensed information. The camera mounted on the body of the robot may result in a problem of a narrow view field, so it has a serious defect in the overall environmental monitoring scope, and accordingly the problem of insufficient sensing information occurs for remote monitoring or visual serving. As a result, the robot cannot effectively recognize the position and size of each area and object in the space, such that it is difficult for the robot and the remote controller to master the working environment of the robot, which may influence the working security and efficiency of the robot.

In another US Patent US2007174777A1, there provides a virtual environment displayed by an intuitive computer GUI, which eliminates the disadvantages of the massy drawings and too many catalogue list levels in the conventional window graphic user interface. A main characteristic of this prior patent lies in employing a three-dimensional office scene frame as the base for allocating the user interface. For example, by selecting a telephone icon on the desk, the actual telephone system can be operated, and by selecting a paper icon on the desk, the file can be opened, or by selecting a printer icon, the actual printer can be used, etc. However, the three-dimensional office scene frame is not the actual working scene of the robot, so it cannot be applied to arrange the robot's working space. In other words, the user cannot change the functional attribute of the object in the three-dimensional office scene frame through utilizing his/her familiarity with the environment and the actual requirements.

Furthermore, currently, indoor designs and arrangements have become diversified. If the environment can merely be recognized by the robot itself, it is difficult to achieve an excellent performance. Therefore, it has become an important issue for the robot manufacturing industry how to enable the user to directly facilitate the robot to recognize each area or important objects in the environment and thus offering more effective services.

SUMMARY OF THE INVENTION

Accordingly, the present invention is mainly directed to a system and a method for graphically allocating robot's working space. The user can directly assign an area attribute and an object type in the robot's working space by remotely monitoring the GUI (graphic user interface) on the computer, for example, assigning a certain area as a wall, marking the position of a charging station, or directly assigning the robot to execute a specific work in a certain area. In the present invention, the user or remote controller are capable of facilitating the robot to provide safer and more effective services by making full use of his/her environment recognition.

The present invention is also directed to a system for graphically allocating robot's working space, which includes: an image extractor, a task-allocating server, and a robot. Each of the image extractor, the task-allocating server, and the robot has a communication unit and a memory unit. The image extractor retrieves an image of an environmental space, and then transmits the image to the task-allocating server. A GUI of the task-allocating server includes a robot's working scene area, a space attribute allocating area, and a robot's task area. The space attribute allocating area enables the user to define the attributes of each area (or object) in the robot's working scene area, and the task-allocating server records the attributes of the area in a memory unit thereof; the robot's task area enables the user to assign the specific work to be executed in the above area and then the task-allocating server transmits a control command to the robot, such that the robot executes the specific work in the area.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
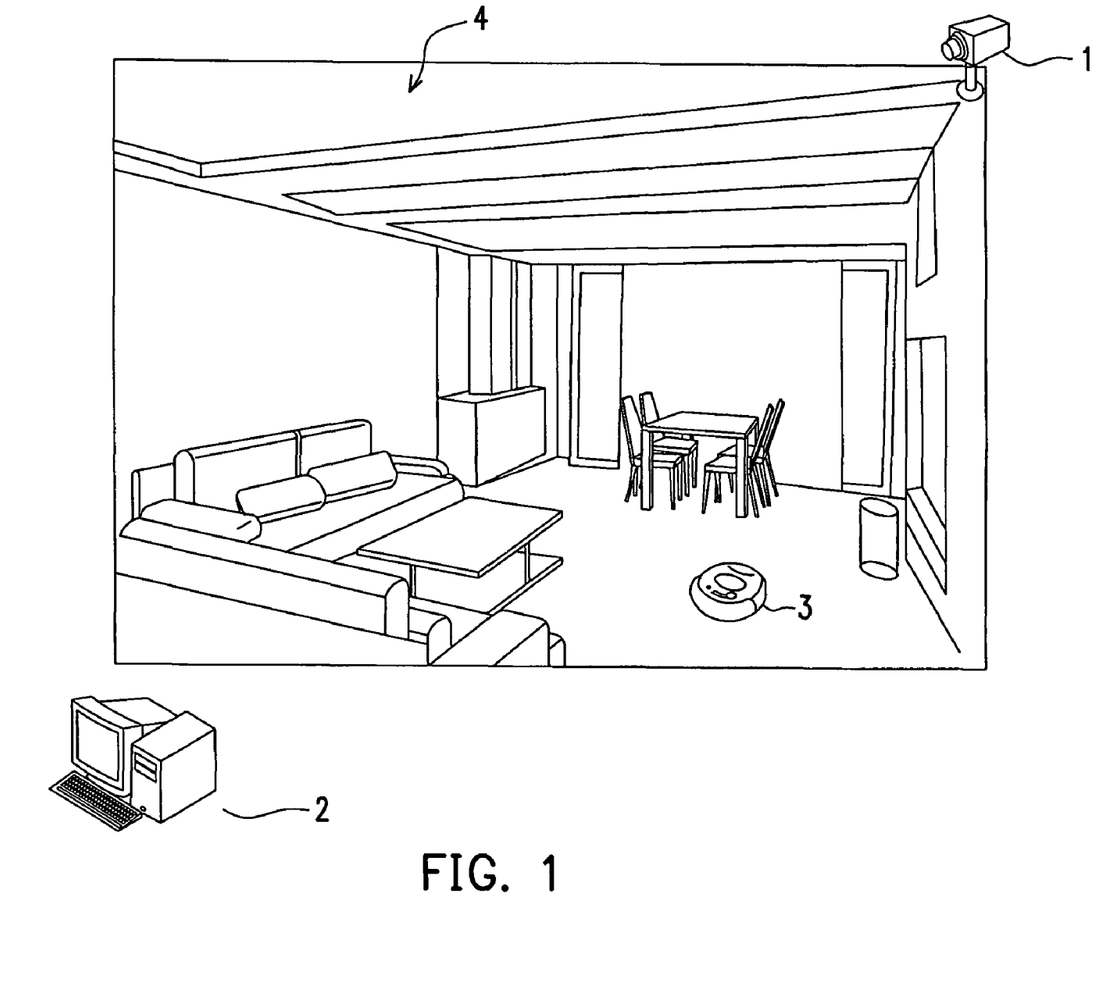
FIG. 1 shows a system for graphically allocating robot's working space according to a first embodiment of the present invention.
Figure 2:
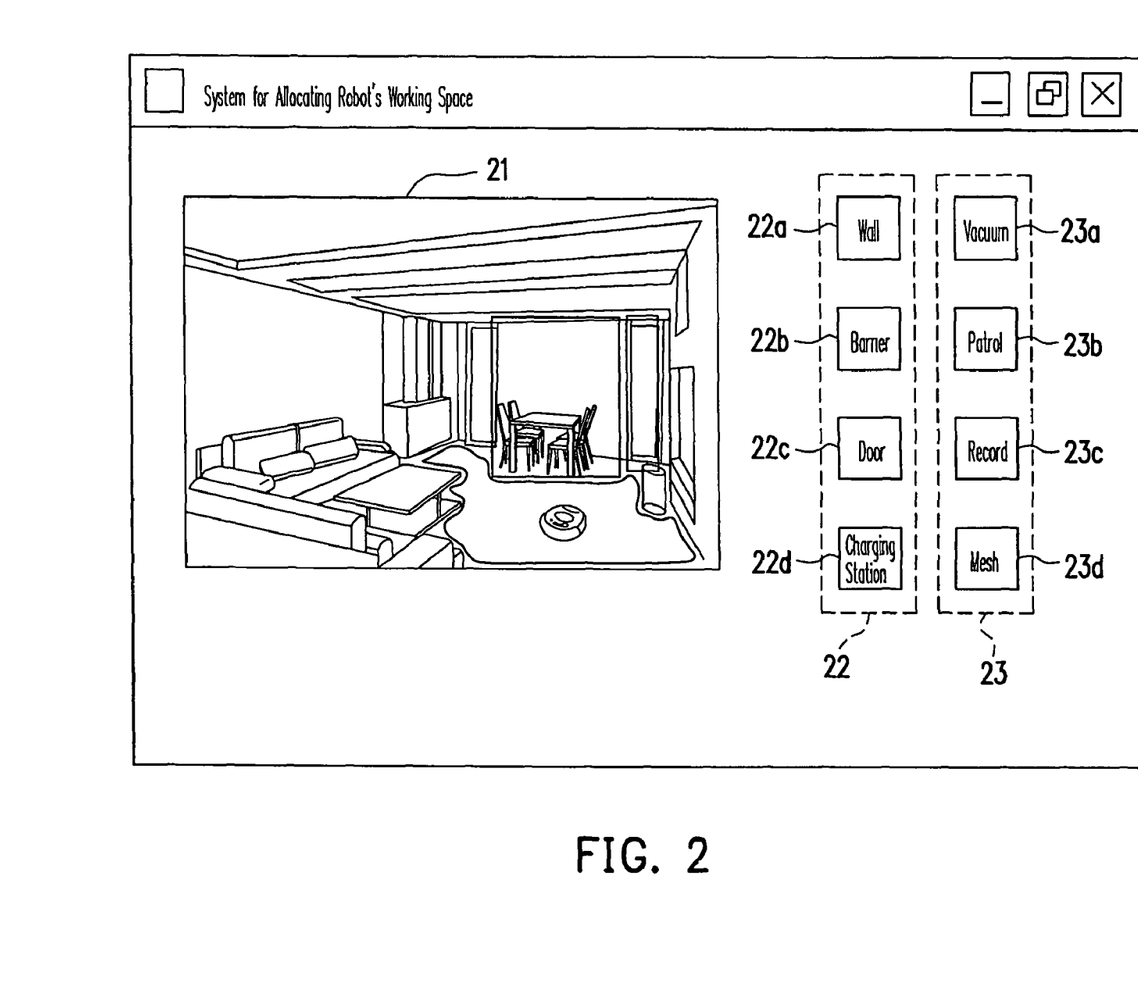
FIG. 2 shows a GUI of a task-allocating server according to the first embodiment of the present invention.

Firstly, "robot" herein is defined as a moving platform capable of executing a certain specific task. Therefore, regardless of a wheel-drive mode (or automatic vehicle) or a feet-moving mode, all such platforms are called robots. A first embodiment of the present invention is for example shown in FIG. 1, the system for graphically allocating robot's working space includes an image extractor 1, a task-allocating server 2, and a robot 3, and each of these three parts has a communication unit and a memory unit. The image extractor 1, for example, a video camera, retrieves an image of an environmental space 4, and then transmits the image to the task-allocating server 2 through the communication unit so that the image is displayed in the frame generated by the GUI. Next, referring to FIG. 2, the GUI of the task-allocating server 2 includes a robot's working scene area 21 (i.e., the image of the environmental space 4), a space attribute allocating area 22 and a robot's task area 23. The space attribute area 22 further includes attributes, for example, "wall" 22a, "barrier" 22b, "door" 22c, and "charging station" 22d. The robot's task area 23 includes tasks "vacuum" 23a, "patrol" 23b, "record" 23c, and "mesh" 23d. The space attribute area 22 enables the user to define the attributes of each area (or object, for example, desk, chair, and wall, etc.) of the robot's working scene area 21, for example, "barrier", and "charging station", etc. The space attribute area may be used to define the boundary of the working space for the robot or the robot's moving path. In addition to recording the area attributes in the memory unit, the task-allocating server 2 further informs the robot to recognize the attributes of the environmental area, that is, to recognize where the position of the barrier and the position of the charging station are. The robot's task area 23 provides the corresponding tasks of "vacuum" and "patrol" matching with the area attributes, which are provided for the user to define the task to be executed by the robot for each object of the robot's working scene area 21. For example, the user selects the task area 23 of the robot 3 in the GUI as shown in FIG. 2, and drags and drops "vacuum" 23a into the "ground area" object of the robot's working scene area 21 in the GUI with a mouse. In this manner, the task-allocating server 2 converts the dragged task "vacuum" 23a into a corresponding control signal and transmits the control command to the robot 3 through the communication unit, such that the robot 3 begins to execute the task of "vacuum" in the actual working space corresponding to the "ground area".

Figure 3:
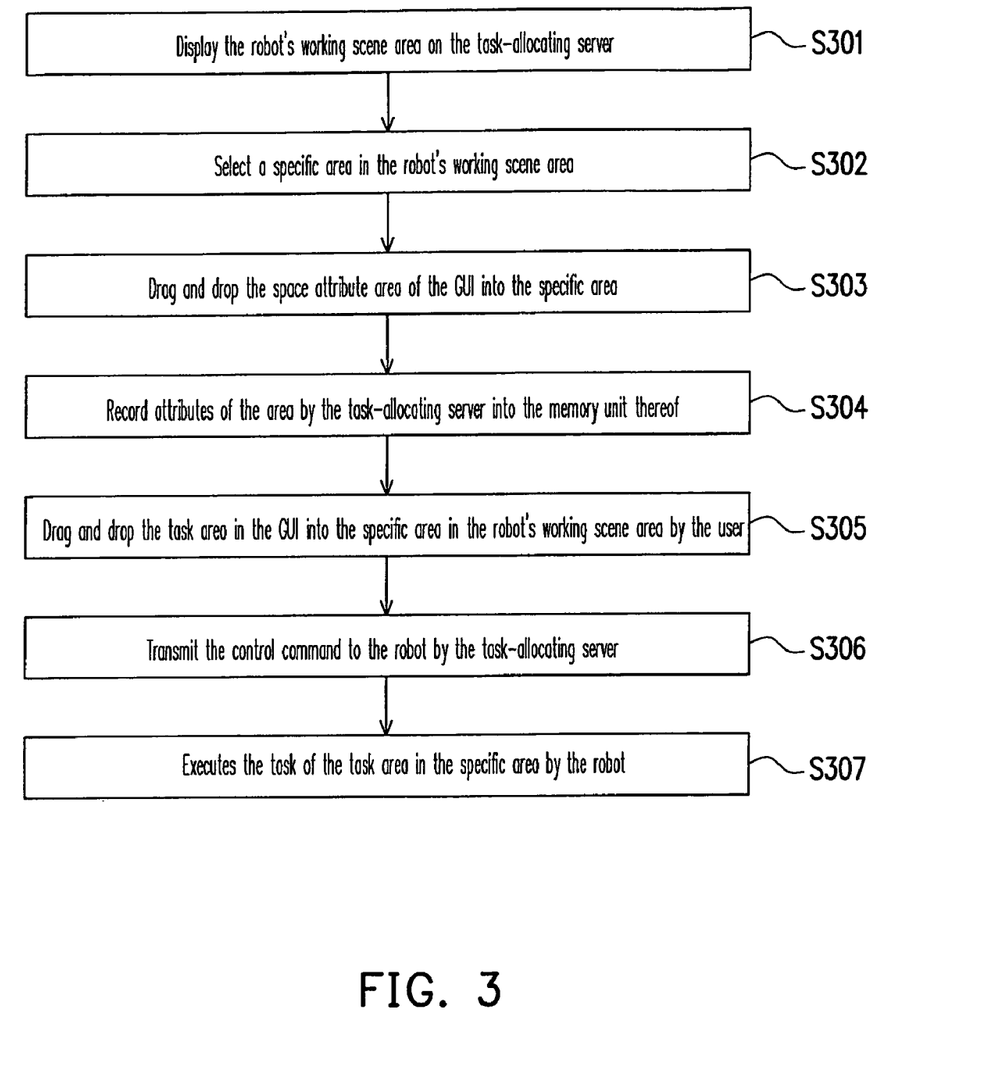
FIG. 3 is a flow chart of a method for graphically allocating robot's working space according to the first embodiment of the present invention.

As shown in FIG. 3, a method for graphically allocating robot's working space according to the present invention at least includes the following steps. The image extractor 1 retrieves an image of the environmental space 4, and transmits the image to the task-allocating server 2 so that the image is displayed on the robot's working scene area 21 in the GUI of the server, as shown in Step S301. Then, as shown in Step S302, the user firstly selects a specific area in the robot's working scene area 21. Next, as shown in Step S303, the space attribute area 22 in the GUI is dragged and dropped into the specific area. The space attribute area includes a wall, a barrier, a doorway, or a robot's charging station, etc. Then, the task-allocating server 2 records attributes of the area in a memory unit thereof, as shown in Step S304. Then, as shown in Step S305, the user drags and drops the task area 23 in the GUI into another specific area in the robot's working scene area 21. As shown in Step S306, once the dragging and dropping motion is finished, the task-allocating server 2 converts the dragged task into a corresponding control signal and transmits the control command to the robot, such that the robot begins to execute the task of the task area 23 in the another specific area.

Figure 4:
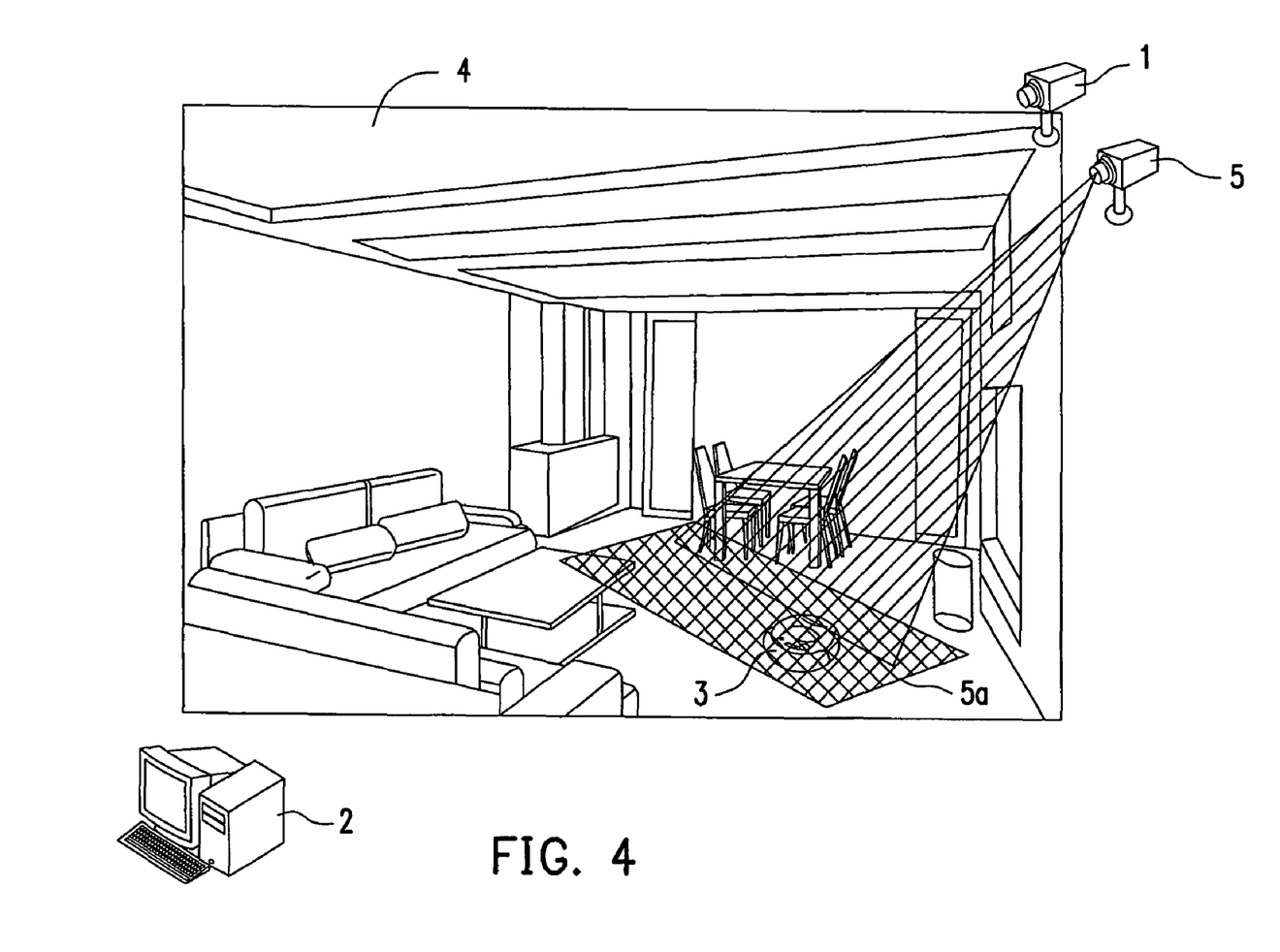
FIG. 4 shows a system for graphically allocating robot's working space according to a second embodiment of the present invention.

A second embodiment of the present invention is shown in FIG. 4, the system for graphically allocating robot's working space includes an image extractor 1, a task-allocating server 2, a robot 3, and a projection device 5, and each of the image extractor 1, the server 2 and the robot 3 has a communication unit and a memory unit. The projection device 5 may project a grid pattern 5a to the environmental space 4, and the projection size of the grid pattern 5a is known. Similar to FIG. 2, the image extractor 1 retrieves the image of the environmental space 4, transmits the image to the task-allocating server 2 through the communication unit so that the image is displayed on the robot's working scene area 21 in the GUI of the server. Then, the user can directly define the position and size of each area in the environmental space 4 by means of selecting a place on the image. After selecting a certain area scope, the user selects the space attribute area in the GUI, for example, wall, barrier, doorway, or robot's charging station, etc. After selecting, the task-allocating server 2 records the attributes of the area in the memory unit thereof. Meanwhile, since the projection size of the grid pattern 5a is known, the task-allocating server 2 may take the grid pattern 5a displayed in the GUI as the reference for calculating the distance, that is, evaluating the actual space size or area size from the size of the grid pattern 5a and the number of pixels occupied by the pattern in the frame, and then stores the result in the memory unit thereof. In addition, the user can also select the task type for the robot 3 in the GUI, which, for example, is implemented by dragging and dropping "collect" 23a into the "ground area" of the robot's working scene area 21 in the GUI with a mouse. In this manner, the task-allocating server 2 converts the dragged task "vacuum" 23a into a corresponding control signal and transmits the control command to the robot 3 through the communication unit, such that the robot begins to execute the task of "vacuum" in the actual working space corresponding to the "ground area". The task-allocating server 2 may adjust the control command according to the pre-stored data of space size or area size.

Figure 5:
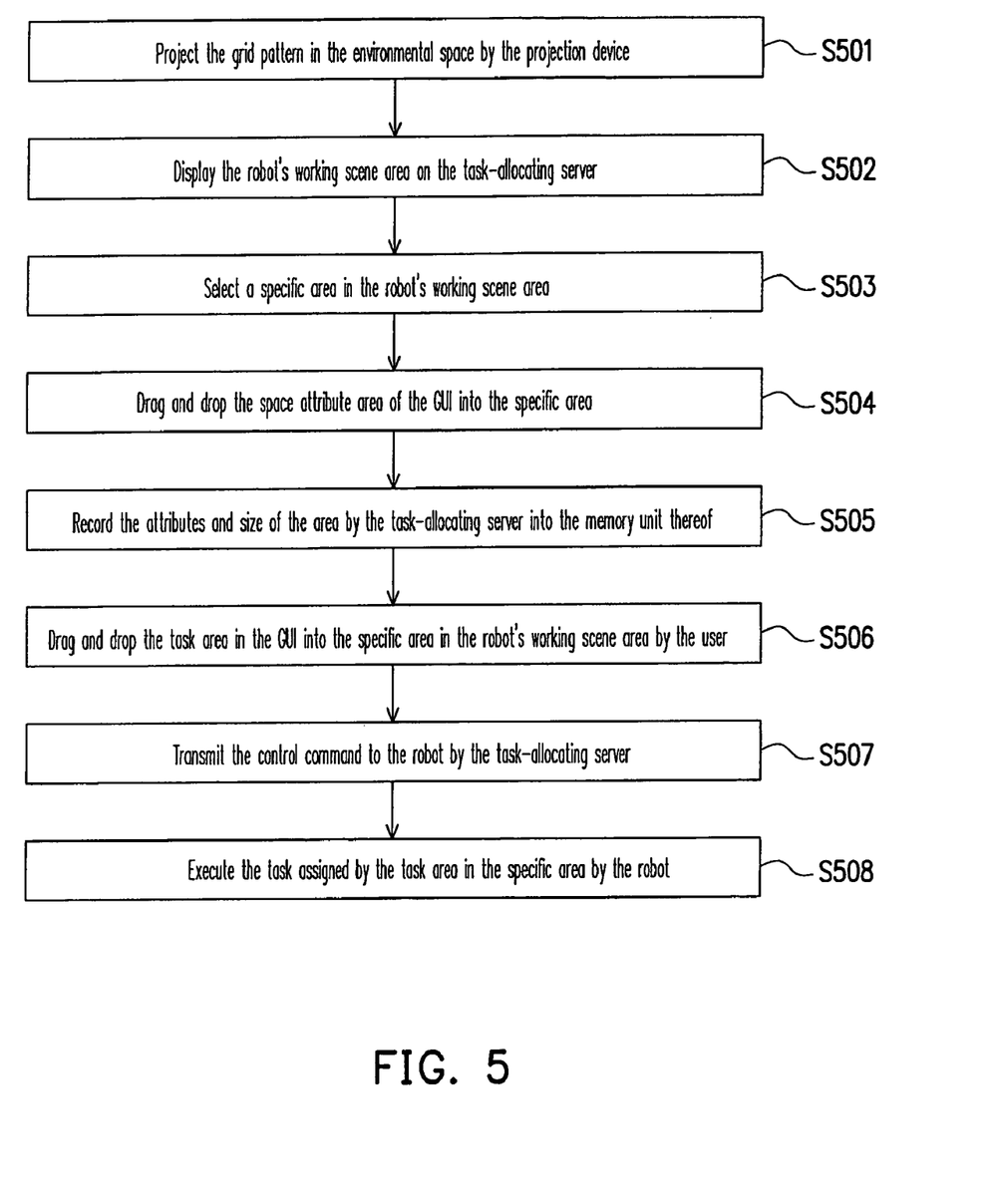
FIG. 5 is a flow chart of a method for graphically allocating robot's working space according to the second embodiment of the present invention.

As shown in FIG. 5, a method for graphically allocating robot's working space according to the second embodiment of the present invention at least includes the following steps. As shown in Step S501, the projection device 5 projects the grid pattern 5a in the environmental space 4. Next, as shown in Step S502, the task-allocating server 2 displays the robot's working scene area in the GUI thereof. Next, as shown in Step S503, the user firstly selects a specific area in the robot's working scene area 21. Then, as shown in Step S504, the space attribute area 22 of the GUI is dragged and dropped into the specific area. Then, as shown in Step S505, the task-allocating server 2 records the attributes and size of the area in the memory unit thereof. Then, as shown in Step S506, the user drags and drops the task area in the GUI into another specific area in the robot's working scene area 21. Then, as shown in Step S507, once the dragging and dropping motion is finished, the task-allocating server 2 converts the dragged task into a corresponding control signal and transmits the control command to the robot 3, so that the robot 3 begins to execute the work of the task area 23 in the another specific area, as shown in Step S508.

Figure 6:
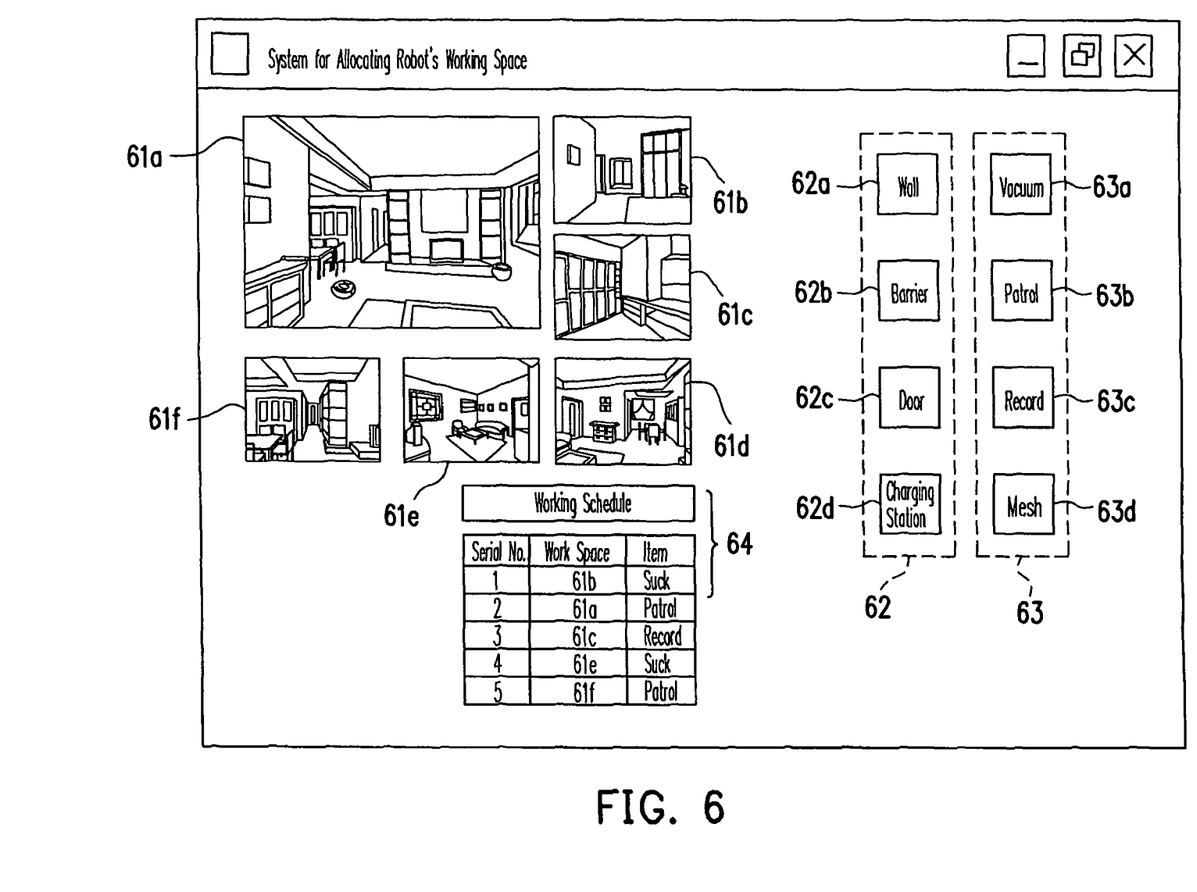
FIG. 6 shows a GUI a task-allocating server according to a third embodiment of the present invention.

FIG. 6 shows a GUI of a task-allocating server according to a third embodiment of the present invention. The third embodiment is similar the first embodiment except that a plurality of image extractors are mounted at different positions of the environmental space. The plurality of image extractors retrieve different view images of the environmental space and transmits the images to the task-allocating server through the communication unit so that the images are displayed on a plurality of robot's working scene areas 61a-61f in the GUI, as shown in FIG. 6. The displaying manner of the plurality of robot's working scene areas 61a-61f may be in a single frame, but each frame may be switched manually or automatically. As shown in FIG. 6, the GUI further includes a space attribute area 62 and a robot's task area 63. The space attribute area 62 further includes attribute definitions, for example, "wall" 62a, "barrier" 62b, "door" 62c, and "charging station" 62d. The robot's task area 63 includes task definitions of "vacuum" 63a, "patrol" 63b, "record" 63c, and "mesh" 63d.

The user can directly define the position and size of each object in the robot's working scene areas 61a-61f through selecting a place on the images. After selecting a certain area scope, the user selects the space attribute area 62 in the GUI, for example, "wall" 62a, "barrier" 62b, "door" 62c, and "charging station" 62d, etc. After selecting, the task-allocating server records the attributes of the area in the memory unit thereof. In addition, the user can also select the robot's task area 63 in the GUI, and then drag and drop the task area into a certain object of the robot's working scene areas 61a-61f in the GUI with a mouse. For example, the user can drag and drop the "vacuum" 63a in the task area into the "ground area" of the robot's working scene areas 61a-61f. After the dragging and dropping motion is finished, each task is displayed as a list 64 in the GUI according to the sequence and number of the working space, such that the user conveniently gets to know the work schedule and adjustment. Meanwhile, the task-allocating server converts the dragged task into a corresponding control signal and transmits the control command to the robot through the communication unit, so that the robot begins to execute the assigned work in the assigned area.

Figure 7:
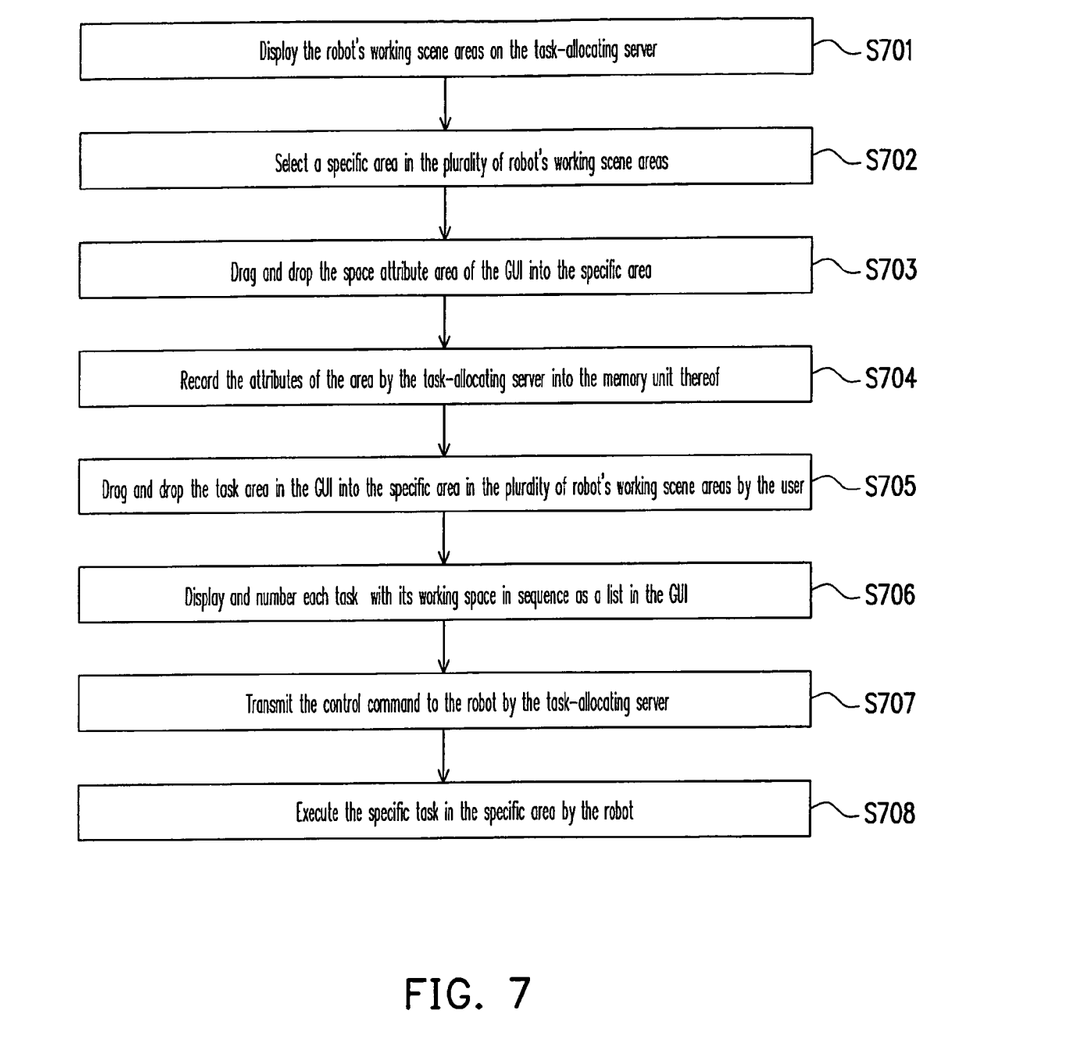
FIG. 7 is a flow chart of a method for graphically allocating robot's working space according to the third embodiment of the present invention.

As shown in FIG. 7, a method for graphically allocating working space for a robot according to the third embodiment of the present invention at least includes the following steps. A plurality of image extractors retrieve a plurality of images of the environmental space and transmits the images to the task-allocating server so that the images are displayed on a plurality of robot's working scene areas 61a-641f in the GUI of the server, as shown in Step S701. Next, as shown in Step S702, the user firstly selects a specific area in the plurality of robot's working scene areas 61a-61f. Next, as shown in Step S703, the user drags and drops the space attribute area 62 of the GUI into the specific area. Then, the task-allocating server records attributes of the area in the memory unit thereof, as shown in Step S704. Then, as shown in Step S705, the user drags and drops the task area 63 in the GUI into another specific area in the robot's working scene area 61. Then, as shown in Step S706, each task is displayed as a list 64 in the GUI according to the sequence and the number of the working space. Then, as shown in Steps S707 and S708, once the dragging and dropping motion is finished, the task-allocating server converts the dragged task into a corresponding control signal and transmits the control command to the robot, so that the robot begins to execute the work of the task area 63 in the another specific area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for graphically allocating robot's working space, comprising: an image extractor, a task-allocating server and a robot physically independent from the image extractor, wherein each of the image extractor, the task-allocating server and the robot has a communication unit and a memory unit; the task-allocating server further comprises a graphic user interface (GUI), and the GUI further comprises a robot's working scene area, a space attribute area, and a task area;

wherein after the image extractor extracts an image of an environmental space, the image is transmitted to the task-allocating server by the communication unit and displayed on the robot's working scene area in the GUI; the robot's working scene area defines at least one area for the image of the environmental space; the space attribute area defines an attribute of the area in the robot's working scene area, and the task-allocating server records the attribute of the area in a memory unit thereof; the task area defines a specific task to be executed matching with the attribute of the area, and the task-allocating server converts the specific task into a control command for being transmitted to the robot through the communication unit, such that the robot executes the specific task in the area of the environmental space defined with the space attribute area.

2. The system according to claim 1, wherein a projection device is further mounted in the environmental space, for projecting a grid pattern; the grid pattern is extracted by the image extractor, then transmitted to the task-allocating server, and then displayed in the GUI of the task-allocating server; the task-allocating server takes the grid pattern displayed in the GUI as a reference for calculating a distance, that is, evaluating an actual space size or object size from the size of the grid pattern and number of pixels occupied by the pattern in a frame, and storing a result in the memory unit thereof.

3. The system according to claim 1, wherein a plurality of image extractors are adopted, and the image extractors are mounted at different positions of the environmental space, for extracting images of the environmental spaces, and transmitting the images to the task-allocating server, and the images are displayed on a plurality of robot's working scene areas in the GUI.

4. The system according to claim 3, wherein frames of the plurality of robot's working scene areas in the GUI have different sizes.

5. The system according to claim 3, wherein a displaying manner of the plurality of robot's working scene areas in the GUI is in a single frame, but each frame is switched manually or automatically.

6. The system according to claim 1, wherein the user independently defines types and quantities of the space attribute area and task area in the GUI.

7. The system according to claim 1, wherein the user sets the space attribute area in the GUI as a boundary of the robot's working space.

8. The system according to claim 1, wherein the user sets the space attribute area in the GUI as the robot's moving path.

9. A method for graphically allocating robot's working space, at least comprising:
 using an image extractor to extract an image of an environmental space, transmitting the image to a task-allocating server, and then displaying the image on a robot's working scene area in a GUI of the task-allocating server, wherein the image extractor is physically independent from the task-allocating server and a robot;
 selecting at least one specific area in the robot's working scene area, and defining an attribute of the specific area through a space attribute area in the GUI, wherein the task-allocating server records the attribute of the specific area in a memory unit thereof;
 defining a specific task matching with the attribute of the specific area through a task area in the GUI; and
 converting the specific task into a control command and transmitting the control command to the robot through the task-allocating server, such that the robot begins to execute the specific task in the specific area.

10. The method according to claim 9, wherein a projection device is further mounted in the environmental space, for projecting a grid pattern; the grid pattern is extracted by the image extractor, then transmitted to the task-allocating server, and then displayed in the GUI of the task-allocating server; the task-allocating server takes the grid pattern displayed in the GUI as a reference for calculating a distance, that is, evaluating an actual space size or object size from the size of the grid pattern and number of pixels occupied by the pattern in a frame, and storing a result in the memory unit thereof.

11. The method according to claim 9, wherein a plurality of image extractors are adopted, and the image extractors are mounted at different positions of the environmental space, for extracting images of the environmental spaces, and transmitting the images to the task-allocating server, and the images are displayed on a plurality of robot's working scene areas in the GUI.

12. The method according to claim 11, wherein frames of the plurality of robot's working scene areas in the GUI have different sizes.

13. The method according to claim 11, wherein a displaying manner of the plurality of robot's working scene areas in the GUI is in a single frame, but each frame is switched manually or automatically.

14. The method according to claim 9, wherein the user independently defines types and quantities of the space attribute area and task area in the GUI.

15. The method according to claim 9, wherein the space attribute area in the GUI is set as a boundary of the robot's working space.

16. The method according to claim 9, wherein the space attribute area in the GUI is set as the robot's moving path.

17. The method according to claim 9, wherein defining the attribute of the specific area through the space attribute area in the GUI is achieved by dragging and then dropping the space attribute area of the GUI into the specific area.

18. The method according to claim 9, wherein defining the task of the specific area through the task area in the GUI is achieved by dragging and then dropping the task area of the GUI into the specific area.

* * * * *